(12) United States Patent
Lin et al.

(10) Patent No.: US 8,226,997 B2
(45) Date of Patent: Jul. 24, 2012

(54) WHOLE GRAIN RICE COMPOSITIONS AND COATING METHODS

(75) Inventors: Yah-Hwa E. Lin, Cerritos, CA (US); Sergio Alberto Jimenez-Marquez, Dallas, TX (US); Irene Luna Guzman, Long Beach, CA (US); Rebecca Lynn Skolmutch, Orange, CA (US); Cheri Elizabeth Myers, Long Beach, CA (US); Michael J. Wilson, Rossmoor, CA (US)

(73) Assignee: Mars, Inc., McLean, VA (US)

( * ) Notice: Subject to any disclaimer, the term of this patent is extended or adjusted under 35 U.S.C. 154(b) by 622 days.

(21) Appl. No.: 11/951,246

(22) Filed: Dec. 5, 2007

(65) Prior Publication Data

US 2009/0148562 A1    Jun. 11, 2009

(51) Int. Cl.
*A23L 1/30* (2006.01)
*A23L 1/00* (2006.01)
(52) U.S. Cl. .............................. 426/72; 426/89; 426/302
(58) Field of Classification Search .................... 426/93, 426/72
See application file for complete search history.

(56) References Cited

U.S. PATENT DOCUMENTS

| | | | | |
|---|---|---|---|---|
| 4,341,805 | A * | 7/1982 | Chaudhary | 426/481 |
| 4,446,163 | A | 5/1984 | Galle et al. | 426/448 |
| 4,687,669 | A | 8/1987 | Moritaka et al. | 426/72 |
| 4,765,996 | A | 8/1988 | Misaki et al. | 426/72 |
| 4,769,251 | A | 9/1988 | Wenger et al. | 426/459 |
| 4,886,675 | A | 12/1989 | Jodlbauer | 426/242 |
| 5,069,919 | A * | 12/1991 | Weibel | 426/261 |
| 5,292,537 | A * | 3/1994 | Hammond | 426/44 |
| 5,705,207 | A | 1/1998 | Cook et al. | 426/89 |
| 6,010,732 | A | 1/2000 | Van Lengerich et al. | 426/516 |
| 6,174,559 | B1 | 1/2001 | Shulman et al. | 426/656 |
| 6,383,545 | B1 | 5/2002 | Huber et al. | 426/516 |

(Continued)

FOREIGN PATENT DOCUMENTS

EP    0947444 B1    7/2004

(Continued)

OTHER PUBLICATIONS

PCT Search Report/Written Opinion for PCT/US2008/085490, filed Dec. 4, 2008: date of mailing of PCT Search Report Jul. 23, 2009.

(Continued)

*Primary Examiner* — D. Lawrence Tarazano
*Assistant Examiner* — Jerry W Anderson
(74) *Attorney, Agent, or Firm* — Fulbright & Jaworski L.L.P.

(57) ABSTRACT

The present invention relates to compositions of matter comprising a rice grain, which has been at least partially milled, and, on the surface of the rice grain, a coating comprising bran, a material which increases the fiber value of the composition, or a combination thereof. The present invention provides for compositions that may have the benefits of traditional white rice, i.e., soft mouth feel, short cook times, easy to digest, white appearance, long shelf-life, etc., with the benefits of brown rice, i.e., high nutritional value and enhanced flavor. Indeed, the nutritional value of the compositions of the present invention may be equal to or better than that of wholegrain brown rice. The present invention further relates to methods for the preparation of a whole grain rice composition. In one embodiment the methods comprises at least partially milling rice grains, and coating on the surface of the rice grains, a coating comprising bran, a material which increases the fiber value of the composition, or a combination thereof.

14 Claims, 5 Drawing Sheets

U.S. PATENT DOCUMENTS

| | | | |
|---|---|---|---|
| 6,416,802 B1 * | 7/2002 | Lin et al. | 426/238 |
| 7,097,870 B2 * | 8/2006 | Funk et al. | 426/96 |
| 2004/0247756 A1 | 12/2004 | Imura | 426/482 |
| 2006/0153954 A1 | 7/2006 | Ito et al. | 426/302 |
| 2007/0054029 A1 * | 3/2007 | Squire et al. | 426/618 |
| 2007/0196559 A1 | 8/2007 | Fukumori et al. | 426/618 |

FOREIGN PATENT DOCUMENTS

| | | | |
|---|---|---|---|
| JP | 2000-245364 | | 9/2000 |
| JP | 2000245364 | | 9/2000 |
| JP | 2003-061595 | * | 8/2001 |
| JP | 200132713 | | 8/2002 |
| JP | 2003-61595 | | 3/2003 |
| JP | 2004 313090 A | | 11/2004 |
| JP | 2004321014 | | 11/2004 |
| KR | 2000 0071982 A | | 12/2000 |
| KR | 2004062704 | | 7/2004 |
| KR | 2006 0006568 A | | 1/2006 |
| KR | 10-2006-0022212 | | 3/2006 |
| KR | 2006-0022212 | | 3/2006 |
| KR | 2006 0022212 A | | 3/2006 |
| KR | 2007 0001369 A | | 1/2007 |
| WO | WO 01/10244 A | | 2/2001 |
| WO | 03092408 A1 | | 1/2003 |
| WO | 2005053433 A1 | | 6/2005 |
| WO | 2006076781 A1 | | 7/2006 |
| WO | WO2006138705 | * | 12/2006 |

OTHER PUBLICATIONS

PCT International Search Report and Written Opinion for PCT/IB2008/003671, filed Dec. 4, 2008, Applicant MARS, Incorporated: PCT Search Report Mailed Apr. 22, 2009.

International Preliminary Report on Patentability issued Jun. 8, 2010 during the prosecution of International Application No. PCT/US2008/085490.

* cited by examiner

WHOLE GRAIN RICE COMPOSITIONS AND COATING METHODS

FIELD OF THE INVENTION

The present invention relates to white rice-like grains (dry and cooked) that possess a higher nutritional value than ordinary white rice and in particular to rice grains coated with bran and other materials that increase, among others, the fiber content of the rice grain as compared with conventional white rice.

BACKGROUND OF THE INVENTION

Rice is one of the leading food crops of the world, second only to wheat in terms of annual production for food use. It is a staple food for about 60% of the world's population. Rice is a semi-aquatic, annual grass that can be grown under a broad range of climatic conditions. The principle parts of a rough rice grain are the hull, pericarp, seed coat, nucellus, embryo, aleurone layer, and endosperm. The hull is the outer covering of the caryopsis (brown rice). The hull comprises about 18-20% by weight of the rough rice grain and serves a protective function against insect infestation and environmental fluctuations. Removal of the hull from the rough grain rice by shelling exposes the caryopsis. The caryopsis comprises four distinct layers. These include the pericarp, seed coat, nucellus, and aleurone. Along with much of the embryo (i.e., germ), these layers comprise the bran portion of the rice grain. The bran portion accounts for about 5-8% of the brown rice weight and is the most nutritious part of the caryopsis.

Rice is consumed in two forms, brown rice and white rice. In both forms, the hull is removed from the rice grain through shelling to yield brown rice. White rice, however, is produced by removing the bran portion of brown rice through a process called "milling." Brown rice is extremely high in nutritional value. Consumption of brown rice may lead to a more complete diet and may help prevent diseases such as high cholesterol, heart disease, and diabetes. Brown rice also has a desirable flavor. There are, however, some disadvantages with brown rice. For example, brown rice has a chewy texture, is more difficult to digest than white rice, and it takes longer to cook. Furthermore, brown rice has a poor shelf life; because brown rice contains the germ of the rice grain along with essential oils, if brown rice remains at room temperature for an extended period of time, the germ and essential oils may oxidize, leading to rancid odor and taste.

White rice has several advantages over brown rice. White rice is preferred by most consumers because of its appearance, its texture, and its shorter cook time compared to brown rice. White rice also has a longer shelf-life because the germ and essential oils are removed during the milling process. White rice, however, does have some drawbacks. First, the taste of white rice is often blander than brown rice. More significantly, white rice is much less nutritious than brown rice, because a majority of the nutritional value of rice is found in the bran. For example, white rice contains only about a fifth of the fiber found in brown rice, it has a much lower concentration of B vitamins and important minerals, and has substantially lower amounts of essential oils.

Because of its high nutritional value, brown rice is preferable for the large portion of the World that relies on rice as a staple food, but its longer cook time and less appealing appearance and eating quality make it a less preferred choice for the consumer. Additionally, brown rice has a shorter shelf life and this may represent a challenge for its distribution and use. Thus, a more stable product such as white rice is thought to be required. Even in areas where rice is not a staple food and a short shelf life may not be so significant, such as the United States, the superior nutritional value of brown rice makes it a better health decision. In these areas, however, white rice is still preferred due to its appearance, texture, and shorter cook times.

There have been efforts to develop a product that possess improved nutritional benefits of white rice such as increased fiber content and increased vitamin and mineral content. These efforts fall short from producing rice grains that have the desirable attributes of white rice but also contain a comparable amount of nutrients to brown rice.

For example, Squire et al. (US 2007/0054029) have developed a method to infuse fiber into a rice grain for use in rice-based cereals. In this process, soluble fiber is included in a rice cooking solution. The resultant grains are fiber-infused, but do not contain bran. Furthermore, the fiber-increasing material is limited to soluble fiber.

Satake (JP 2000-245364) has shown a rice grain coated with a bran-containing coating. The grains are mixed in a bran-containing solution and subsequently dried. Upon cooking, the bran coating may quickly separate from the grain because the bran is soluble. Consequently, coating a grain with an amount of bran higher than the disclosed amount would appear to be fruitless as the coating would simply separate from the rice grain during cooking.

In an attempt to alleviate this coating problem, Satake (JP 2003-061595) further developed a method to coat rice grains with saccharified bran. Prior to coating, bran is enzymatically saccharified to produce a viscous solution that may be coated onto the rice grain. Even with this technique, however, concentrations of only 2% (by weight) of saccharified bran are disclosed as being coated onto rice grains. Furthermore, the coating material does not include fiber and it contains only enzymatically altered bran.

To date, rice coatings have been limited to small amounts of bran because the bran easily separates from the rice grain during the cooking process. Furthermore, coating bran onto white rice to obtain a white rice-like product that is as nutritious as brown rice is counterintuitive since the bran would provide similar undesirable eating qualities as brown rice (such as chewiness) and darker color. Accordingly, a white rice grain that, when cooked, possesses similar or better nutritional value of brown rice while providing similar eating and cooking characteristics as white rice without the associated drawbacks is greatly desired.

SUMMARY OF THE INVENTION

The present invention relates to compositions of matter comprising rice grains, which have been at least partially milled, and, on the surface of the rice grains, a coating comprising bran, a material which increases the fiber value of the composition, or a combination thereof. The bran used for the coating in the present invention may be cereal bran. Preferably, the bran is rice bran. In one embodiment, the bran is stabilized.

In certain embodiments, the fiber value increasing material is rice fiber, corn fiber, oat fiber, chicory fiber (inulin fiber), oligofructose, bean fiber, apple fiber, bran fiber, barley fiber, citrus fiber, wheat fiber, beet fiber, banana fiber, onion fiber, aloe vera fiber, carboxy methyl cellulose, cellulose, plant fiber, bamboo fiber, seaweed fiber, cactus fiber, or mixtures thereof. Preferably, the fiber value increasing material is inulin fiber. In certain embodiments, the inulin fiber comprises between about 1% (w/w dry basis) and about 10% (w/w dry basis) of the composition.

The rice grains of the compositions of the present invention may be parboiled subsequent to milling. The rice grains may be at least partially parboiled prior to milling. In certain embodiments, milling removes between about 82% (w/w dry basis) and about 92% (w/w dry basis) of the bran and germ from the rice grains. Milling may remove essentially all of the bran and germ from the rice grains. Total bran may comprise greater than about 3% (w/w dry basis) of the compositions. Preferably, total bran comprises greater than about 7% (w/w dry basis) of the compositions. The coated bran may be comminuted. In one embodiment, the bran may have an average particle size of less than about 150 μm. The bran may be treated with heat and/or at least one agent to control pH or oxidation. The bran may also be exposed to an FDA food—acceptable bleaching agent. The bran may further be defatted.

In one embodiment, the coating may comprise a binding agent. Preferably, the binding agent comprises between about 0.05% (w/w dry basis) and about 3.0% (w/w dry basis) of the compositions. Preferably, the coating is a slurry. In one embodiment, the rice grains have been puffed or instantized prior to coating.

The compositions may further comprise a particulate composition comprising at least one of seasoning, flavoring, flavor enhancer, colorant, dietary fiber, herb, vitamins, minerals, phytonutrients, and combinations thereof. The seasoning may comprise at least 0.1% and up to 5% (w/w dry basis) of the composition. The compositions may further comprise particulate bran.

The present invention further relates to methods for the preparation of whole grain rice compositions. The methods may comprise at least partially milling rice grains, and coating on the surface of the rice grains, a coating containing bran, a material which increases the fiber value of the whole grain rice composition, or a combination thereof.

DETAILED DESCRIPTION OF ILLUSTRATIVE EMBODIMENTS

The foregoing and other aspects of the present invention will become apparent from the following detailed description of the invention when considered in conjunction with the accompanying drawings. For the purpose of illustrating the invention, there is shown in the drawings, embodiments that are presently preferred, it being understood, however, that the invention is not limited to the specific examples or instrumentalities disclosed.

The present invention relates to compositions of matter comprising a rice grain, which has been at least partially milled, and, on the surface of the rice grain, a coating containing bran, a material which increases the fiber value of the composition, or a combination thereof.

The present invention provides for compositions that have the benefits of traditional white rice, i.e., soft mouth feel, short cook times, easily digested, white appearance, long shelf-life with the benefits of brown rice, i.e., high nutritional value and enhanced flavor. This may be accomplished through coating a rice grain with a coating comprising bran (with or without germ) and a material that increases the fiber value of the composition. The coating may comprise additional nutrients, such as vitamins, minerals or phytonutrients. The coating may also comprise flavorings and/or seasonings. In one embodiment, the coating process utilized provides for higher concentrations of bran to be coated onto the rice grain that will remain on the grain during the cooking process. Indeed, in some embodiments, the nutritional value of the composition of the present invention may be equal to or better than that of wholegrain brown rice. Furthermore, the appearance (e.g., color, shape and size) may resemble that of white rice.

Figure 1:
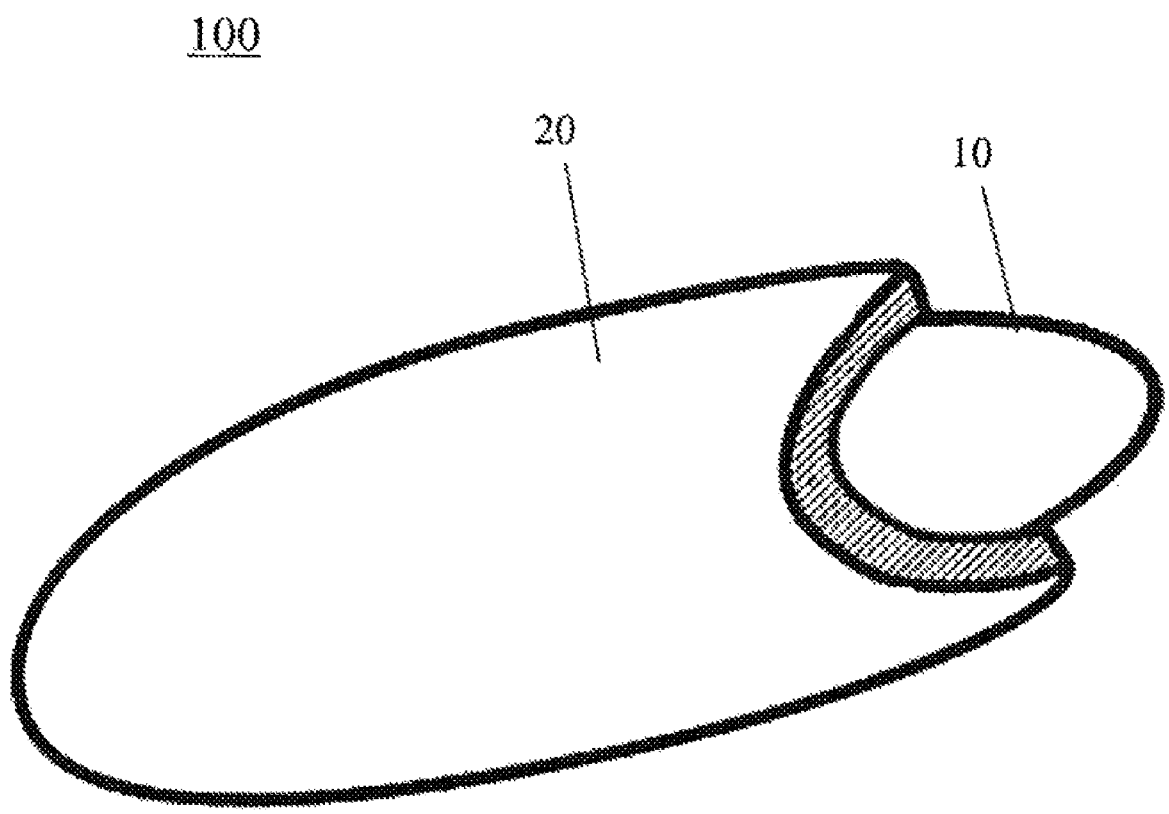
FIG. 1 is a three-dimensional perspective view of an exemplary coated rice grain.
Figure 2:
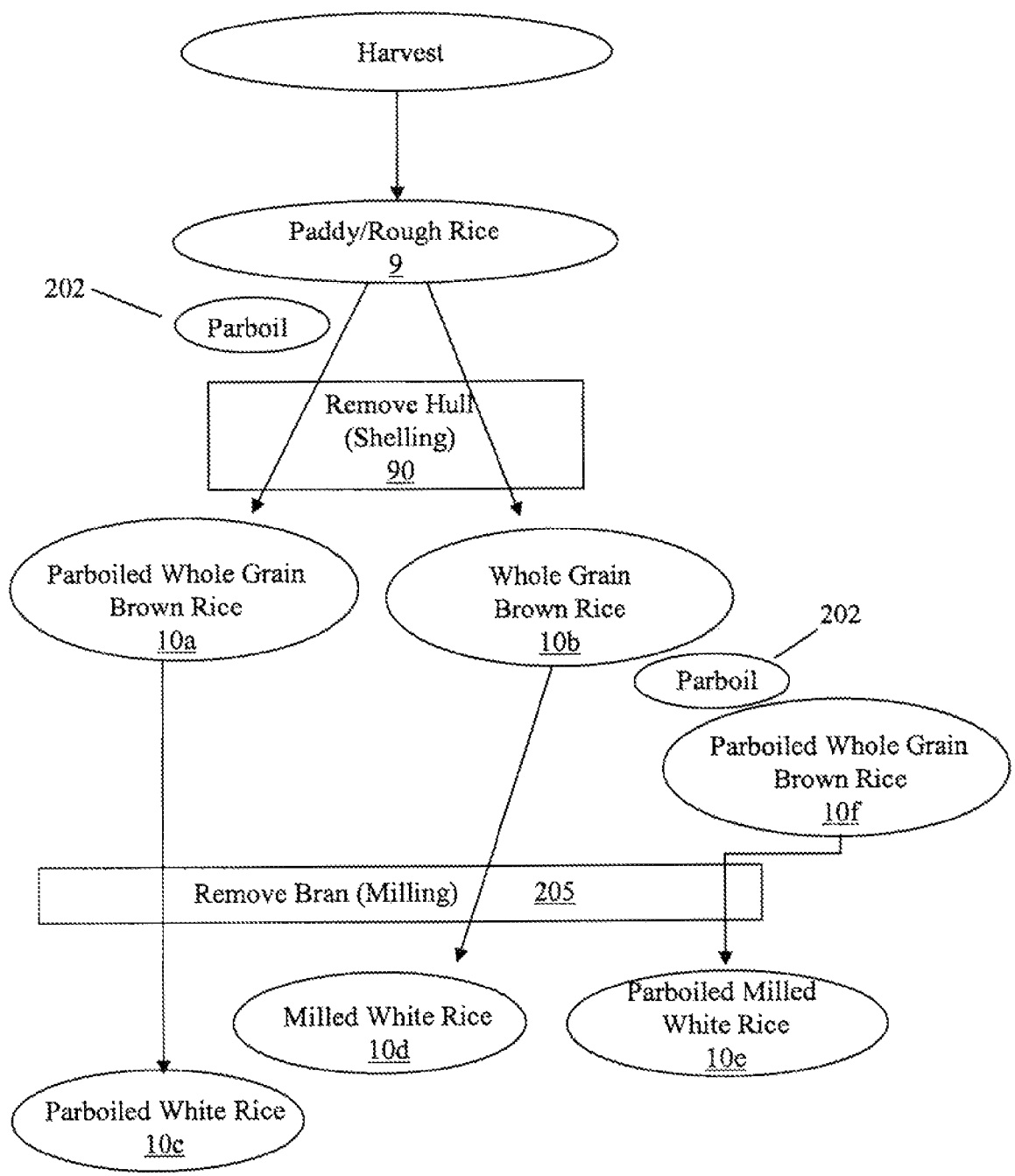
FIG. 2 is a flow chart of an exemplary method to process exemplary rice grains.

FIG. 1 is a three-dimensional perspective view of an exemplary coated rice grain 100 of the present invention. The coated rice grain 100 comprises a rice grain 10 and a coating 20. Various forms of rice grains are suitable for this invention. FIG. 2 provides an overview for processing exemplary rice grains for use in some embodiments of the present invention. These include, for example, parboiled brown rice 10*a* and 10*f*, regular brown rice 10*b*, parboiled white rice 10*c*, regular milled white rice 10*d*, and parboiled white rice 10*e*, among others. As used herein, brown rice refers to any rice having part or the entire bran layer still attached to the rice grain.

Initially, rough rice grains 9 are harvested and the hulls may be removed 90 by shelling. Regular brown rice 10*b* is produced by removing the hull from rough rice 90. Milled white rice 10*d* is produced by removing the bran 205 from regular brown rice 10*b*. Milled white rice 10*d* is extremely versatile. It can be used for various types of dishes. Also, milled white rice 10*d* has a neutral taste. A disadvantage of milled white rice 10*d* is that the rice may lose its taste and texture when it is overcooked, leading to a less than desirable final product. Furthermore, milled white rice 10*d* has much less nutritional value than brown rice.

Regular brown rice 10*b* may be parboiled 202 prior to milling 205. If the brown rice is parboiled 10*f* prior to milling, the resultant rice grain is referred to as parboiled white rice 10*e*. A significant advantage of parboiled white rice 10*e* is its short preparation time. Parboiled white rice 10*e* may be prepared in less than 10 minutes. Often precooked parboiled white rice 10*e* may be packaged in a perforated bag. This bag may then be submerged into boiling water to cook the rice. This product is often referred to as "boil-in-bag rice."

Rough rice 9 may be parboiled 202 prior to shelling. If the rough rice is parboiled prior to shelling, the resultant grain is referred to as parboiled brown rice 10*a*. The bran may be removed 205 from parboiled brown rice to produce parboiled white rice 10*c*. Parboiled white rice 10*c* has a firm, separate texture, withstands processing well, and is ideal for various applications. Parboiled white rice 10*c* is not as nutritious as brown rice.

Figure 3:
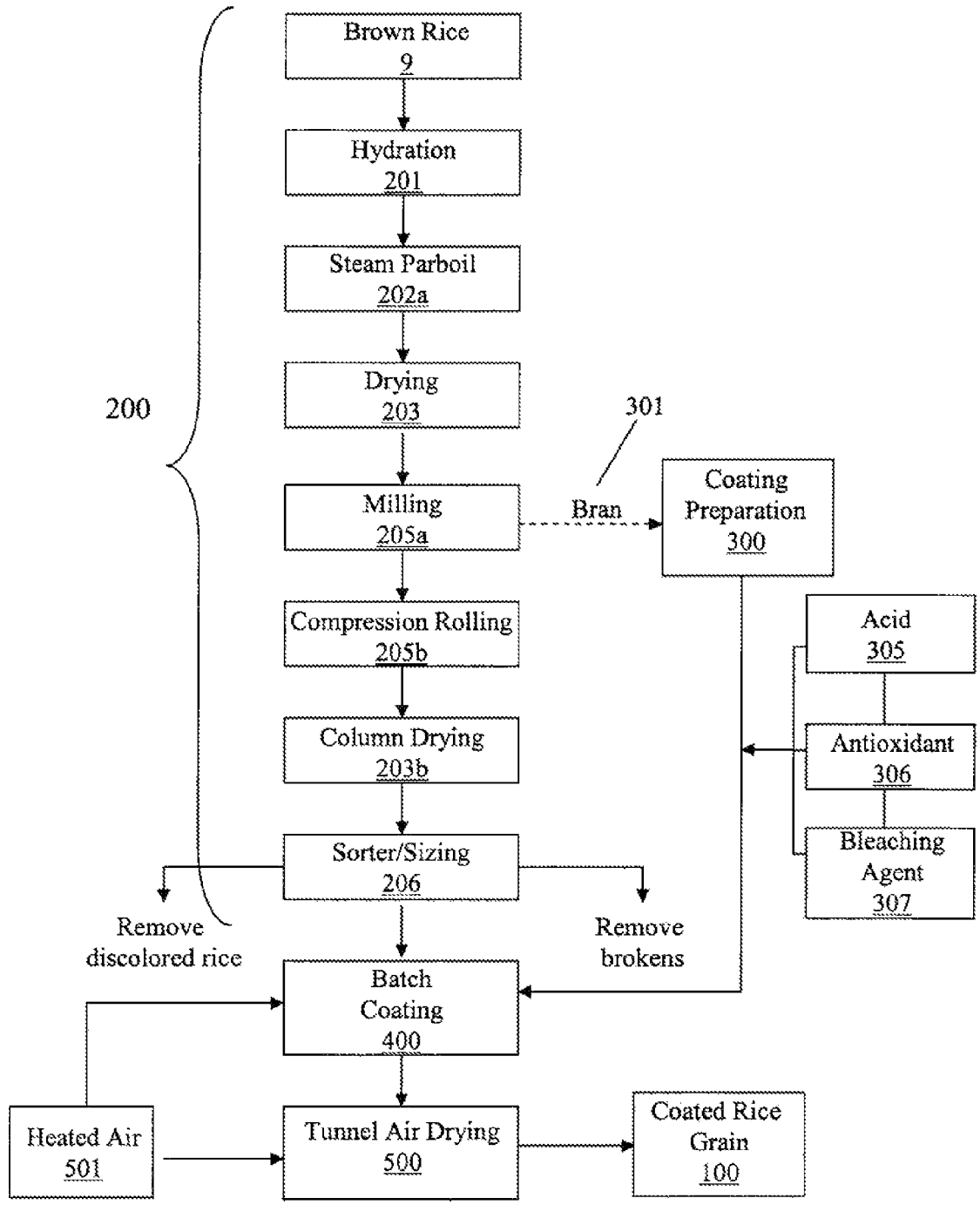
FIG. 3 is a flow chart of an exemplary method to process exemplary rice grains suitable for the present invention.

FIG. 3 is an exemplary process flow diagram for the production of an exemplary rice grain 10 for use in the present invention. Rough rice 9 may be shelled to remove the hull 90. The rough rice may be parboiled 202 prior to shelling. In certain embodiments, the rice grains may be hydrated 201. Suitable hydration methods include vacuum, pressurized, and atmospheric hydration. In one embodiment, grains are hydrated by atmospheric hydration. Preferably, the hydration time is between about 0.5 and about 4 hours. More preferably, the hydration time is between about 1.5 hours and 2.5 hours. Preferably, the hydration temperature is between about 60 and about 70° C. More preferably, the hydration temperature is between about 65° C. and about 70° C. In certain embodiments, the % hydration of the rice grain ranges from about 28% to about 35%. Preferably, the percent hydration ranges from about 31% to about 34%.

The rice grains may be parboiled 202. Parboiling may occur after hydration, after milling, or prior to milling. In certain embodiments, the rice grains are partially parboiled to about 50% gelatinization of the starch. In other embodiments, the rice grains are essentially fully parboiled. As used herein, "essentially fully parboiled" may be defined as rice that has a starch gelatinization greater than about 90%

Suitable parboiling methods include hot air, hot sand, microwave and steam parboiling. In a preferred embodiment, the grains are steam parboiled 202a. Steam parboiling 202a may occur at a high temperature. As used herein, high temperature may be defined as greater than about 100° C. Steam parboiling 202a may also occur for a short duration. As used herein, short duration may be defined as less than about 15 minutes. In a preferred embodiment, steam parboiling 202a occurs at a temperature greater than about 105° C. In a more preferred embodiment, the temperature is greater than about 110° C. In a preferred embodiment, the duration of steam parboiling 202a may occur for a duration between about 1 minute and about 10 minutes. In a more preferred embodiment, the duration of steam parboiling 202a may occur for a duration between about 1 minute and about 1.5 minutes. In one embodiment, steam parboiling may occur at a pressure greater than atmospheric pressure. In a preferred embodiment, the pressure is greater than about 10 psig. In a more preferred embodiment, the pressure is greater than about 18 psig.

The partially parboiled rice grains may be treated with at least one agent to control pH or oxidation (not shown). Suitable agents include citric acid, adipic acid, ascorbic acid, malic acid, acetic acid, or mixtures thereof. In a preferred embodiment, the agent to control pH or oxidation is ascorbic acid.

Rice grains may be dried following parboiling. Suitable drying methods include fluidized bed drying, band drying, column drying, tunnel air drying, among others. Drying may be performed in either a single step or in multiple steps. In one embodiment, drying is performed in one step. In a preferred embodiment, drying is performed in multiple steps.

In a preferred embodiment, following parboiling, rice grains may be dried by passing through a fluidized bed dryer 203 at a temperature between about 60° C. to about 90° C. and for a duration between about 15 sec and about 20 min. In a more preferred embodiment, the grains are passed through a fluidized bed dryer 203 twice. In certain embodiments, the % dryness of the rice grain ranges from about 16% to about 26%. Preferably, the percent dryness ranges from about 22% to about 24%.

Rice grains may be milled 205 to remove various amounts of bran. Suitable milling methods include friction milling 205a or abbrasive milling 205b. Milling 205 may be performed in a multi-step process and/or using dry or a wet rice In an alternative embodiment, milling may be performed on re-wetted rice. In one embodiment, milling 205a is performed on the rice grains to remove about 2% and up to 12% (dry basis) of the total product. In a preferred embodiment milling 205a is performed to remove about 2% and up to 4% (dry basis) of the total product. In a preferred embodiment compression rolling 205b is performed after wet milling 205a. Preferably, compression rolling 205b is performed with a gap of between about 0.2 mm and 0.9 mm gap, wherein the gap is the clearance distance between two rollers.

Rice grains may be dried following milling. In a preferred embodiment, rice grains are dried using a column dryer 203b. In one embodiment, the rice grains have a moisture content of between about 11% and 14%. In a preferred embodiment, the rice grains have a moisture content of about 12.5%.

The rice grains may be puffed or instantized prior to coating (not shown). As used herein, instantized refers to a process that may comprise hydrate-cooking the milled rice to about 40% to about 70% wet basis moisture, and then exposing the cooked rice under high velocity air to create a dry rice with a puffed and porous structure that is fast cooking—about at least half of the cook time to that of the original dry rice. In one embodiment, the puffed rice grains may be subjected to vacuum and, while in vacuo, exposed to coating material alone or in combination with temperature elevation.

Figure 4:
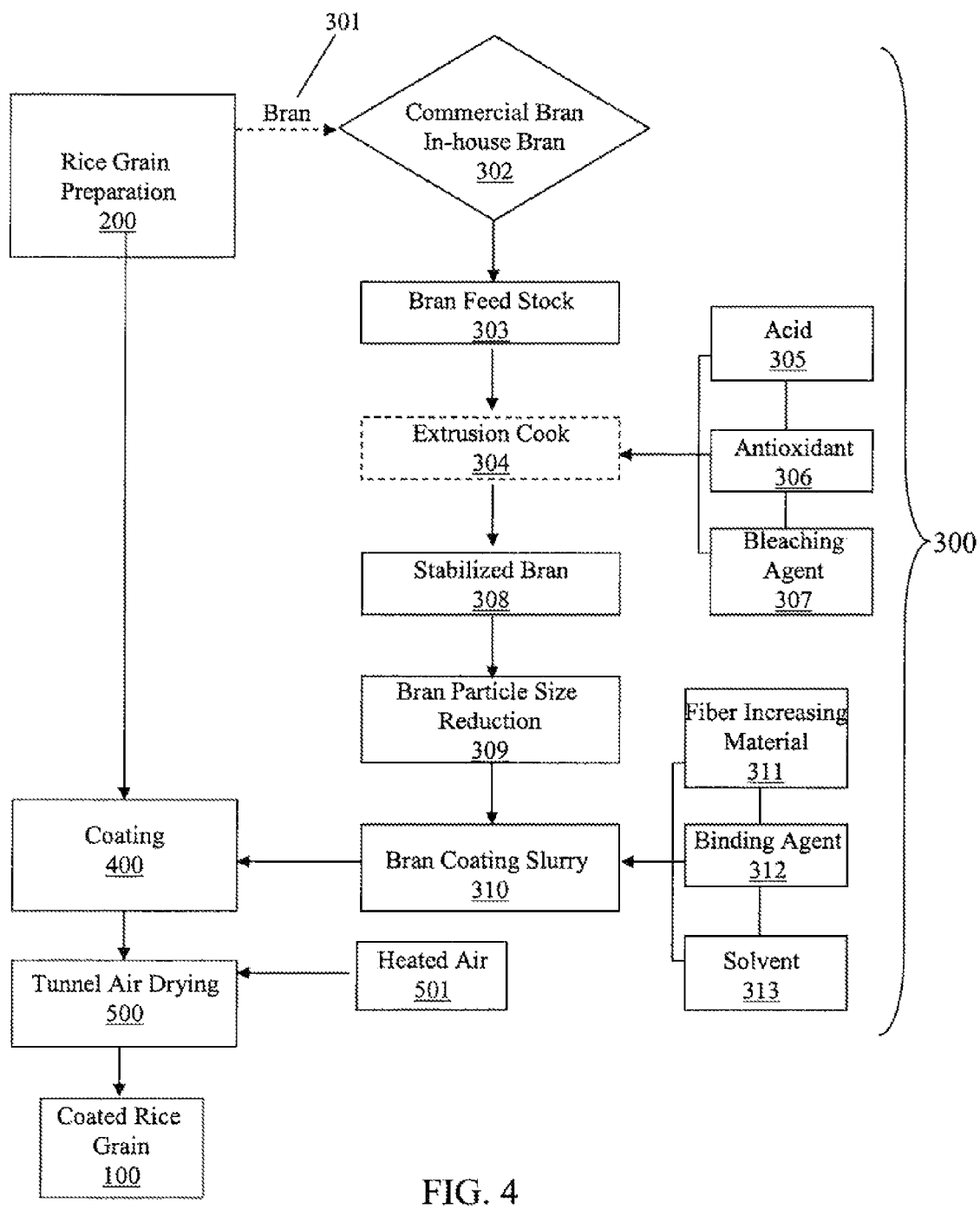
FIG. 4 is a flow chart of an exemplary method to process an exemplary coating suitable for the present invention.

Following preparation of the rice grain 10, the rice grain may subsequently be coated with a coating 20. The coating 20 may comprise bran 302 and a material which increases the fiber value of the composition 311. FIG. 4 is an exemplary process flow diagram for the production of an exemplary coating 20 comprising bran 302 and a material which increases the fiber value of the composition 311. Bran may be produced "in-house" from the milling of brown rice to white rice during the rice grain preparation process 301. For example, the bran removed during the preparation of rice grains as exemplified in FIG. 3 may be used in the preparation of the coating 20. Bran from other sources may also be utilized in the present invention. Suitable bran may include wheat, barley, oat, corn, sorghum, millet, and rice bran. Preferably, the coating composition comprises bran removed from the brown rice grain in the rice grain preparation process 301. In one embodiment, the coating 20 is at least in part comprised of the bran removed from the rice in the wet milling process 302.

The coating 20 may comprise additional enrichment ingredients, such as one or more vitamins and/or minerals. Suitable additional ingredients may include thiamine, riboflavin, niacin, folic acid and iron compounds such as iron orthophosphate. An especially suitable enrichment ingredient is gamma-aminobutyric acid (GABA). GABA occurs naturally in the bran and germ of rice, and is present in increased amounts during germination. GABA may be added to the coating in the products of the present invention, or a bran containing high levels of GABA derived from germinating rice or rice germ or other cereals may be used to form the coating. In any case, the amount of GABA in the products according to these embodiments of the invention is suitably at least about 20 mg/kg based on the weight of the product, for example from about 50 mg/kg to about 200 mg/kg Bran feed stock 303 may be stabilized 308 using various methods known to one skilled in the art. Suitable methods to stabilize bran include heat stabilization through extrusion cooking and acid stabilization. The use of stabilized bran in the coating 20 provides for longer shelf life of the finished product compared to non-stabilized bran. To the stabilized bran, additives may be added to enhance certain characteristics. These additives may include acids to control pH 305, antioxidants 306, and bleaching agents 307. Suitable acids include citric acid, adipic acid, ascorbic acid, malic acid, acetic acid, and mixtures thereof. Antioxidants 306 may be added to the bran to reduce oxidation of the coating and/or the rice grain. Suitable antioxidants may include citric acid, adipic acid, ascorbic acid, malic acid, acetic acid, tocopherol, rosemary extract or combinations thereof. Bleaching agents 307 may be added to lighten the color of the bran. In one embodiment, an FDA food—acceptable bleaching agent 307 is added to the bran. Suitable FDA food—acceptable bleaching agents 307 may include ozone, chlorine, a peroxide, or an enzyme capable of increasing the whiteness index. Preferably the whiteness index of the bran is at least about 55.

In certain embodiments, the particle size of the bran may be reduced 309. Suitable methods to reduce bran particle size include dry milling and wet milling. In one embodiment, bran particle size is reduced by dry milling. In a preferred embodiment, the bran has an average particle size of less than about 200 μm. In another embodiment, the bran has an average particle size of less than about 100 μm. In another embodiment, the bran has an average particle size of less than about 50 μm. Suitable methods to measure the average bran particle size include sieving, water based method, or light scattering method.

The bran may be defatted (not shown). Suitable methods for bran defatting include solvent extraction or carbon dioxide extraction. In one embodiment, the bran fat content is between about 10% and about 35% (w/w) of the bran.

A material that increases the fiber value of the composition 311 may be added to the bran. Suitable fiber value increasing materials 311 include chicory fiber (inulin fiber), oligofructuose, rice fiber, corn fiber, oat fiber, bean fiber, apple fiber, bran fiber, barley fiber, citrus, wheat fiber, beet fiber, banana fiber, onion fiber, aloe vera fiber, carboxy methyl cellulose, cellulose, plant fiber, bamboo fiber, seaweed fiber, cactus fiber, pea fiber, guar gum, acacia gum, carrageenan, locust bean gum, pectin, alginate or mixtures thereof. In a preferred embodiment, the fiber value increasing material 311 is inulin fiber. In one embodiment, the amount of material that increases the fiber value of the composition is between about 1 and about 10% (by weight) of the composition. Preferably, the amount of material that increases the fiber value of the composition is between about 4 and about 7% (by weight) of the composition.

At least one binding agent 312 may be added to the bran to form a coating. Suitable binding agents 312 include gum, starch, protein, gel, or mixtures thereof. Suitable gums include guar gum, acacia gum, locust bean gum, caragenan gum, or mixtures thereof. Suitable starches include rice starch, tapioca starch, maltodextrin, pullalan, potato starch, lotus starch, or mixtures thereof. Suitable proteins include soy protein, milk protein, legume protein, wheat protein, cereal protein, and others including those being enzymatically modified. Suitable gels include gelatine, alginate, or mixtures thereof.

The bran coating may be formed into a slurry 310. To produce the slurry 310, a solvent 313 may be added to the bran/bran mixture. Suitable solvents 313 include water. In one embodiment, the slurry 310 includes from about 50% to about 80% by weight, water.

The coating composition 20 may be coated 400 onto a rice grain 10. Various methods may be used to coat a rice grain with a composition. Suitable methods include fluidized by vibratory bed, fluidized by pneumatic means and batch drum coating 400. Preferably, rice grains 10 and a coating composition 20 are added to a batch drum 400. The batch drum 400 may be operated at a speed of between about 20 revolutions per minute and about 80 revolutions per minute, for a duration between about 5 minutes and about 60 minutes and a temperature of between about 25° C. and about 70° C. Heated air 501 may be introduced into the batch drum. Preferably, the temperature of the heated air 501 is at least about 50-80° C. The addition of heated air 501 into the batch drum 400 facilitates drying of the coating 20 onto the rice grain 10 during the coating process. Simultaneous coating and drying results in a stronger coating with a higher concentration of bran remaining on the rice grain. Preferably, the coating procedure may comprise intermittent heat drying. For example, the rice grain 10 may be coated in the batch drum for about 2 to about 10 minutes without heat and for about 2 to about 10 minutes with heat. Preferably, the rice grain 10 is coated in the batch drum for about 4 to about 6 minutes without heat and for about 4 to about 6 minutes with heat. In a preferred embodiment, the rice grain 10 is coated with a coating composition 20 at least more than one time. In one embodiment, the rice grain 10 is coated with a coating composition 20 three times. In another embodiment, the rice grain 10 is coated with a coating composition 20 four times.

The coated rice grains may be dried 500. Suitable methods to dry the coated rice grains include microwave drying, infrared drying, and tunnel air drying 500. Heated air 501 may be introduced to the tunnel air dryer 500. Preferably, the temperature of the heated air 501 is at least about 50° C.

The coated rice grain 100 may comprise at least about 3% bran. In another embodiment, the coated rice grain 100 comprises at least about 8% bran. The coated rice grain 100 may comprise at least about 1% of a fiber increasing material. In another embodiment, the coated rice grain 100 may comprises at least about 7% of a fiber increasing material. The coated rice grain 100 may comprise from about 0.05% to about 3.0% of a binding agent. Preferably, the coated rice grain 100 may comprise from about 0.05% to about 1% of a binding agent.

The composition of the present invention may further comprise a particulate composition comprising at least one of seasoning, flavoring, flavor enhancer, colorant, dietary fiber and combinations thereof. Suitable seasonings include herbs, spices, seeds and salt. Suitable flavorings include artificial and natural extracts. Suitable flavor enhancers, include salt, sodium, mono sodium glutamate or mixtures thereof. Suitable colorants include FDA approved colorants. Suitable dietary fibers include rice fiber, corn fiber, oat fiber, chicory fiber (inulin), oligofructuose, bean fiber, apple fiber, bran fiber, barley fiber, citrus fiber, wheat fiber, beet fiber, banana fiber, onion fiber, aloe vera fiber, carboxy methyl cellulose, cellulose, plant fiber, bamboo fiber, seaweed fiber, cactus fiber, or mixtures thereof. In other embodiments, the composition of the present invention may also comprise particulate bran.

One embodiment of the present invention is directed to methods for the preparation of whole grain rice composition. The methods may comprise at least partially milling rice grains, and coating on the surface of the rice grains, a coating containing bran, a material which increases the fiber value of the whole grain rice composition, or a combination thereof. In one embodiment, the method may comprise coating the rice grains multiple times. For example, the rice grains may be coated at least three times. In another embodiment, the rice grains may be coated at least four times. A general method for the preparation of the whole grain rice composition involves combining dry, partially milled rice with a coating composition (typically, a water-based slurry containing comminuted bran and/or a fiber increasing material and a binding agent) followed by a drying step. Prior to its application onto the dry, partially milled rice, the coating composition may comprise 45% (w/w) to 65% (w/w) of water and 35% (w/w) to 55% (w/w) of solids. The solids contained in the coating composition may comprise bran, a fiber increasing material and a binding agent. In addition, the coating composition may include at least 0.3% and up to 16.2% (w/w) of seasonings, flavorings, flavor enhancers, colorants, dietary fiber, herbs, vitamins, minerals, phytonutrients, and combinations thereof. In one embodiment, the coating composition is comprised of between about 45% and about 65% (w/w) of water, between about 13% and about 41% (w/w) of bran, between about 9% and about 29% (w/w) of a fiber increasing material, between about 0.4% and about 6.0% (w/w) of binding agent. Once dried, the coating composition has a moisture content of between about 11% and 14%. In a preferred embodiment, the dried coating composition has a moisture content of about 12.5%. The coating applied ranges from about 0.5% (dry weight) of the total composition to about 20% (dry weight). Preferably, the coating applied ranges from about 10% (dry weight) to about 16% (dry weight) of the total composition.

EXAMPLES

The following examples depict certain embodiments of the invention and are intended to be illustrative and not limiting in nature.

Example 1

Preparation of Partially Milled Rice Grains

Partially milled rice grains were prepared from feedstock brown, non-parboiled rice grains (intermediate amylose). The rice grains were hydrated using atmospheric hydration in an excess water screw cooker for 2 hours at 68° C. The hydrated rice grains were steam parboiled in a vertical pressure steamer (in-house design). Steam parboiling occurred for 1.5 minutes at 18 psig and 110° C. Following steam parboiling, the rice grains were subsequently dried using two fluidized bed dryers and a band dryer. The bed dryers (Food Engineering Corporation Controlled Residence Time Fluid Bed Dryer) were operated at a below bed temperature between 70° C. to 85° C. and for a duration between 10 minutes to 14 minutes. The rice grains were passed through two fluidized bed dryers at decreasing temperature and for equal times. The grains were then passed through a band dryer (Food Engineering Corporation 3 Pass Dryer/Cooler) at ambient temperature for 28 minutes. This step was primarily used as a tempering step. Air flow was adjusted to keep the humidity below saturation but temperature was consequential. The typical product temperature at discharge was 40° C. Following drying, the rice grains were milled to remove part of the bran and germ. The first milling pass was performed using a wet milling device (Satake model VTA15A) operated at a 2% degree milling 24% w.b, to remove 88% of the bran from the rice grains. Following wet milling, the rice grains were rolled using a compression roller device (Ferrell Ross Flaking Mill) with roller diamaters of 18×36 inches and operated at a speed of 400 rpm. The gap between rollers was 0.2 mm. The rice grains were subsequently dried using a column dryer (Aeroglide Gas Fired 30 tonne Upright). The rice grains were dried for 480 minutes at 35° C. to 40° C. The rice grains had a final moisture content of 12%.

Example 2

Preparation of Coating Composition A

A coating composition for a coated rice grain was prepared. Commercially available stabilized rice bran (N1050) with particle size (D[4,3]) of 148.77 µm was obtained from Nutracea (El Dorado Hills, Calif.). A coating composition was prepared by combining 80 grams of stabilized rice bran (Nutracea N1050), 20 grams of inulin fiber (Beneo ST from Orafti), 1 gram of guar gum as binding agent and 101 grams of potable water to obtain 202 g of coating composition.

Example 3

Preparation of Coating Composition B

A coating composition for a coated rice grain was prepared. Commercially available stabilized rice bran (N1000) with average particle size (D[4,3]) of 150.59 µm was obtained from Nutracea (El Dorado Hills, Calif.). A wet milling procedure was used to reduce the bran particle size and create a liquified bran slurry as follows:

Step 1. Batches of 318 kg (705 lbs, ~84 gal) with 14.2% rice bran were mixed in a batch APV high shear liquifier.

Step 2. A homogenizer loop consisted of the APV liquifier, a Silverson high shear mixer (model 312/450MS), a Micro-Motion mass flow meter, and an APV homogenizer (operated at 9000 psi). This loop operated at an average of 188 kg/hr (414 lbs/hr). Square openings of the two stators in the Silverson high shear mixer were about 2 mm×2 mm.

The average particle size (D[4,3]) of the liquified bran slurry was quantified as 46.00 µm.

A coating composition was prepared by combining 563 g of liquified bran slurry (containing 80 grams of bran and 483 g of water), 20 grams of inulin fiber (Beneo ST from Orafti) and 1 gram of guar gum as binding agent.

Example 4

Preparation of Coating Composition C

A coating composition for a coated rice grain was prepared. Commercially available stabilized rice bran (N1050) with particle size (D[4,3]) of 148.77 µm was obtained from Nutracea (El Dorado Hills, Calif.). A coating composition was prepared by combining 100 grams of stabilized rice bran (Nutracea N1050) and 100 grams of potable water.

Example 5

Preparation of Coated Rice Grain A

A coated rice grain was prepared. Partially milled rice grains (899 grams) as prepared in Example 1 were added to an 18" Tulip coating pan. The coating composition A as prepared in Example 2 was also added to the coating pan. The coating pan was operated at a speed of 20 rpm. The rice grains were coated using multiple coating steps. Each step comprised the addition of slurry to the coating pan following by intermittent heat drying comprising operating the coating pan for five minutes with no heat, followed by operating the coating pan for five minutes at 60° C. Following this first coating step, additional coating composition slurry was added to the coating pan. The coating pan was again operated for five minutes with no heat, and then operated for five minutes at 60° C. Following this second coating step, the remaining coating composition slurry was added to the coating pan. Total coating composition slurry used was 202 grams. The coating pan was again operated for five minutes with no heat, and then operated for five minutes at 60° C. The resultant coated rice grains comprised of 89.9% (dry weight) partially milled rice, 8% (dry weight) stabilized bran, 2% (dry weight) inulin fiber, and 0.1% (dry weight) guar gum as binder.

Example 6

Preparation of Coated Rice Grain B

A coated rice grain was prepared. Fully milled rice grains (899 grams) were added to an 18" Tulip coating pan. The coating composition B (584 grams) as prepared in Example 3 was also added to the coating pan. The rice grains were coated using a single coating step. The coating pan was operated at a speed of 20 rpm for 60 minutes until all of the slurry was absorbed by the rice. Following this coating step, the coating pan turning speed was switched to 80 rpm and a 60° C. dry heat applied for 60 minutes until the coated rice was dried to reach a finished product moisture of 12%. The resultant coated rice grains comprised of 89.9% (dry weight) fully milled rice, 8% (dry weight) stabilized bran, 2% (dry weight) inulin fiber, and 0.1% (dry weight) guar gum as binder.

Example 7

Preparation of Coated Rice Grain C

A coated rice grain was prepared. Fully milled rice grains (900 grams) were added to an 18" Tulip coating pan. The coating composition C (200 grams) as prepared in Example 4 was also added to the coating pan. The rice grains were coated using a single coating step. The coating pan was operated at a speed of 20 rpm for 60 minutes until all of the slurry was absorbed by the rice. Following this coating step, the coating pan turning speed was switched to 80 rpm and a 60° C. dry heat applied for 60-80 minutes until the coated rice was dry and had a finished product moisture of 12%. The resultant coated rice grains comprised of 90% (dry weight) partially milled rice and 10% (dry weight) stabilized bran.

Table 1 provides a comparison of the characteristics and performance of parboiled white rice, parboiled wholegrain (brown) rice and coated rice using fully milled or partially milled rice, bran with different particle sizes and using either a single coating or a multiple coating process as described in the examples 5, 6 and 7. All samples were cooked following a full water absorption method as follows. Combining ½ cup of rice and 1 cup of water (1⅓ for non-coated rice) in a saucepan, bringing to a boil, reducing heat to medium-low and simmering for the time indicated. Samples were removed from heat and allowed to cool down prior to taking the cooked color measurements. Following the previous cooking instructions, a typical yield of 300 g of cooked rice is obtained.

Color was assessed both by visual observation and a colorimeter (Chroma Meter CR-400, Konica Minolta, NJ). The color was measured as L*, a* and b* color spaces. L* is a measure of the brightness from bleack (0) to white (100); a* describes red-green color with positive a* values indicating redness and negative a* values indicating greeness; b* describes yellow-blue color with positive b* values indicating yellowness and negative b* values indicating blueness.

Figure 5:
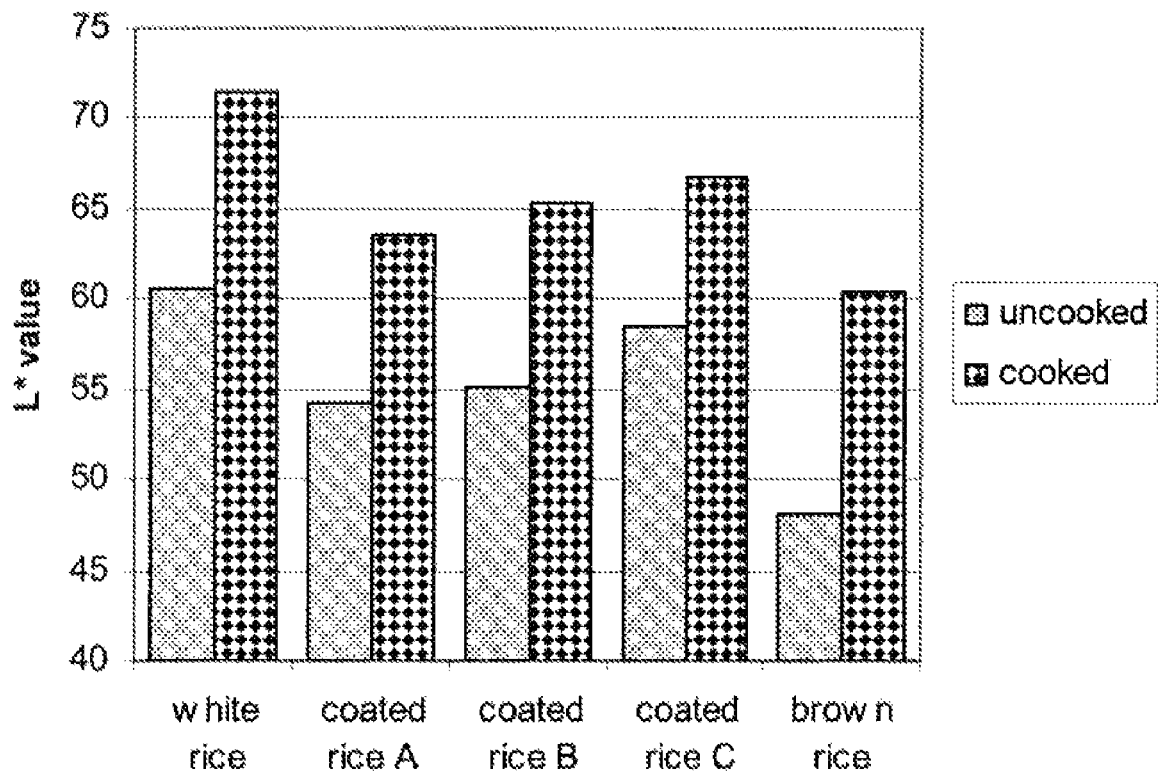
FIG. 5 is a graph comparing L* values of various rice grains.

A darker rice samples is expected to have a higher L* values, while whiter samples should have a lower L* value. As seen in FIG. 5, coated rice samples A, B and C were lighter than brown rice (i.e., had higher L* value numbers) on both the cooked and the uncooked form. Overall, color of the cooked samples was darker than that of the uncooked samples. This is typically seen in both white and brown rice and is believed to be due to the formation of color compounds during the cooking process.

TABLE 1

Product Comparison

| PRODUCT | COLOR UNCOOKED (visual and L*, a*, b* values) | COLOR COOKED (visual and L*, a*, b* values) | COOK TIME (min) | BRAN CONTENT (% d.w.) | TOTAL DIETARY FIBER CONTENT (% d.w.)[†] | COOKED PRODUCT PERFORMANCE | AMOUNT AND FREQUENCY OF POT COATING FROM STARCH AND BRAN |
|---|---|---|---|---|---|---|---|
| Fully milled parboiled rice | White (60.57, 2.4, 16.48) | White (71.41, −0.34, 11.68) | 10 | <0.1 | 1.2 | Off-white color, soft texture, | Minimum residual pot coating; not frequently observed |
| Wholegrain parboiled rice | Light brown (48.06, 5.73, 13.87) | Light brown (60.46, 2.71, 13.16) | 30 | 9 | 4.1 | Chewy texture, darker color, firm bite | Minimum residual pot coating, ocassionally observed |
| Coated rice A (partially milled, multiple step, 150 micron bran) | Lighter brown (54.2, 3.01, 14.04) | Lighter brown (63.61, 1.08, 13.65) | 10 | 8 | 5.4 | Creamy white color, soft texture, slight nutty flavor, better satiety | Slight residual pot coating; ocasionally observed |
| Coated rice B (fully milled, single step, <50 micron bran) | Lighter brown (55.19, 3.24, 14.21) | Lighter brown (65.37, 0.94, 13.64) | 10 | 8 | 5.2 | Creamy white color, soft texture, slight nutty flavor, better satiety | Some residual pot coating; ocasionally observed |
| Coated rice C (fully milled, single step, 150 micron bran) | Lighter brown (58.5, 2.31, 14.16) | Lighter brown (66.77, 0.43, 14.16) | 10 | 10 | 3.0 | Creamy white color, soft texture, slight nutty flavor, better satiety | More significant pot coating, frequently observed |

[†]AOAC Method 985.29

As shown in Table 1 and FIG. 5, coated rice compositions A, B and C had a significantly shorter cook time than brown rice, a creamy-white appearance closer to white rice and a softer, easier to chew texture than brown rice. All coated rice samples (A, B and C) had a higher nutritional value (i.e., fiber content) than fully milled white rice, while coated rice samples A and B had a higher nutritional value than traditional brown rice. In addition, the amount and frequency of residual starch and bran observed at the end of cook was reduced when a multiple step coating process was used (Coated Rice B) instead of a single step coating process (Coated Rice C). Furthermore, the presence of a binding agent (Coated Rice A and B) contributed to a reduced amount of residual starch and bran compared to Coated rice C which did not contain a binding agent.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit of the invention.

What is claimed:

1. A method for preparing coated whole grain rice comprising the steps of:
   milling rice grains to remove 2-12% of the total product;

preparing a coating composition consisting of a slurry of 13-41% bran, 0.4-6.0% gum as a binding agent and 45-65% water as a solvent;

coating the rice grains with the coating composition in which the rice grains are simultaneously coated and dried, wherein the coating composition coats the rice grains more than once such that the coated rice grains comprise at least 8% by weight of bran; and drying the coated rice grains to a finish product moisture of 12%.

2. The method of claim 1, further including the step of compression rolling the milled rice grains prior to the coating step.

3. The method of claim 1, wherein the coating step is carried out by coating methods selected from the group consisting of fluidized by vibratory bed, fluidized by pneumatic means and batch drum coating.

4. The method of claim 1, wherein the bran content of the coated rice grains is between 8% and 20% by weight.

5. The method of claim 1, wherein the bran is selected from the group consisting of wheat, barley, oat, corn, sorghum, millet and rice bran.

6. The method of claim 1, wherein the gum is selected from the group consisting of guar gum, acacia gum, locust bean gum, carrageenan gum, and mixtures thereof.

7. The method of claim 1, wherein the binding agent comprises about 0.05-3.0% of the coated rice grains.

8. The method of claim 1, wherein the rice grains are selected from the group consisting of parboiled brown rice, regular brown rice, parboiled white rice, regular milled rice, and parboiled milled white rice.

9. The method of claim 1, wherein the milling removes about 2% to 4% of the total product.

10. The method of claim 1, wherein the simultaneous drying is with heated air at a temperature of at least about 50-80° C.

11. The method of claim 1, wherein the rice grains are coated at least more than two times and up to four times.

12. The method of claim 1, wherein the coating applied to the rice grain is from about 0.5% to about 20% of the total composition.

13. The method of claim 12, wherein the coating applied to the rice grains is from about 10% to about 16% of the total composition.

14. The method of claim 1, wherein the solvent in the slurry is between 50-80%.

* * * * *